United States Patent

Buss et al.

[11] 3,756,197
[45] Sept. 4, 1973

[54] FISH HUSBANDRY SYSTEM

[75] Inventors: Keen W. Buss, Boalsburg, Pa.;
Richard E. Speece, Austin, Tex.

[73] Assignee: Marine Protein Corporation, New York, N.Y.

[22] Filed: Dec. 16, 1971

[21] Appl. No.: 208,720

[52] U.S. Cl. .......................... 119/3, 55/53
[51] Int. Cl. ............................ A01k 61/00
[58] Field of Search .............. 119/3, 5; 261/93, 261/36 R; 55/53

[56] References Cited
UNITED STATES PATENTS

| | | | |
|---|---|---|---|
| 3,643,403 | 2/1972 | Speece | 55/53 |
| 3,487,440 | 12/1969 | Newsteder | 119/5 X |
| 3,122,126 | 2/1964 | Yamada | 119/3 |
| 3,491,722 | 1/1970 | Levitov et al. | 119/3 |
| 3,116,712 | 1/1964 | Ogden et al. | 119/5 X |
| 3,261,471 | 7/1966 | Halpert | 119/5 X |
| 3,057,094 | 10/1962 | Winkelman | 119/5 X |
| 2,820,548 | 1/1958 | Marcus et al. | 119/5 X |
| 3,476,366 | 11/1969 | Brooks et al. | 261/36 R |

FOREIGN PATENTS OR APPLICATIONS

245,487 10/1969 U.S.S.R. .......................... 119/3

*Primary Examiner*—Louis G. Mancene
*Assistant Examiner*—James H. Czerwonky
*Attorney*—James H. Callahan et al.

[57] ABSTRACT

A fish husbandry system for the high intensity raising of fish in a generally vertical, water-filled tank. An inflow of water passes through a conduit leading into a downwardly divergent hood, the lower end of which is in fluid communication with the water in the lower end of the tank. Oxygen-containing gas is injected under pressure into the water flowing through the hood and forms bubbles. The bubbles are trapped within the hood by the flow of water for a sufficient period to cause a very high proportion of the oxygen in the injected gas to dissolve in the water. A constricted throat means is interposed between the inlet conduit and the top of the hood. At least a portion of the throat means has an internal diameter less than that of the conduit.

2 Claims, 7 Drawing Figures

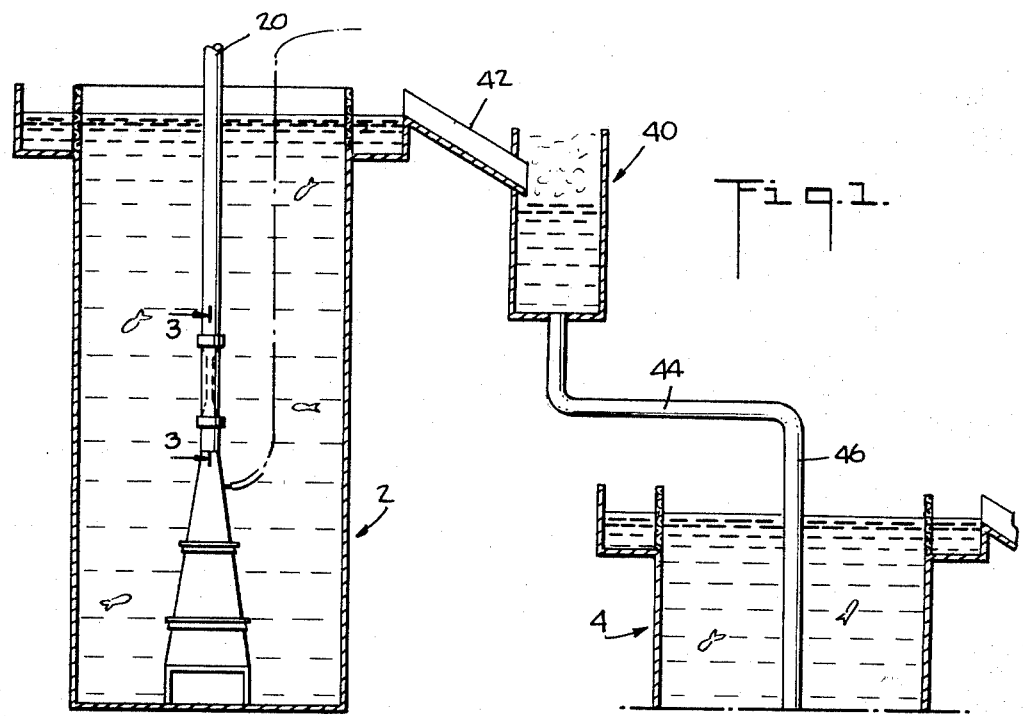
Fig. 1.
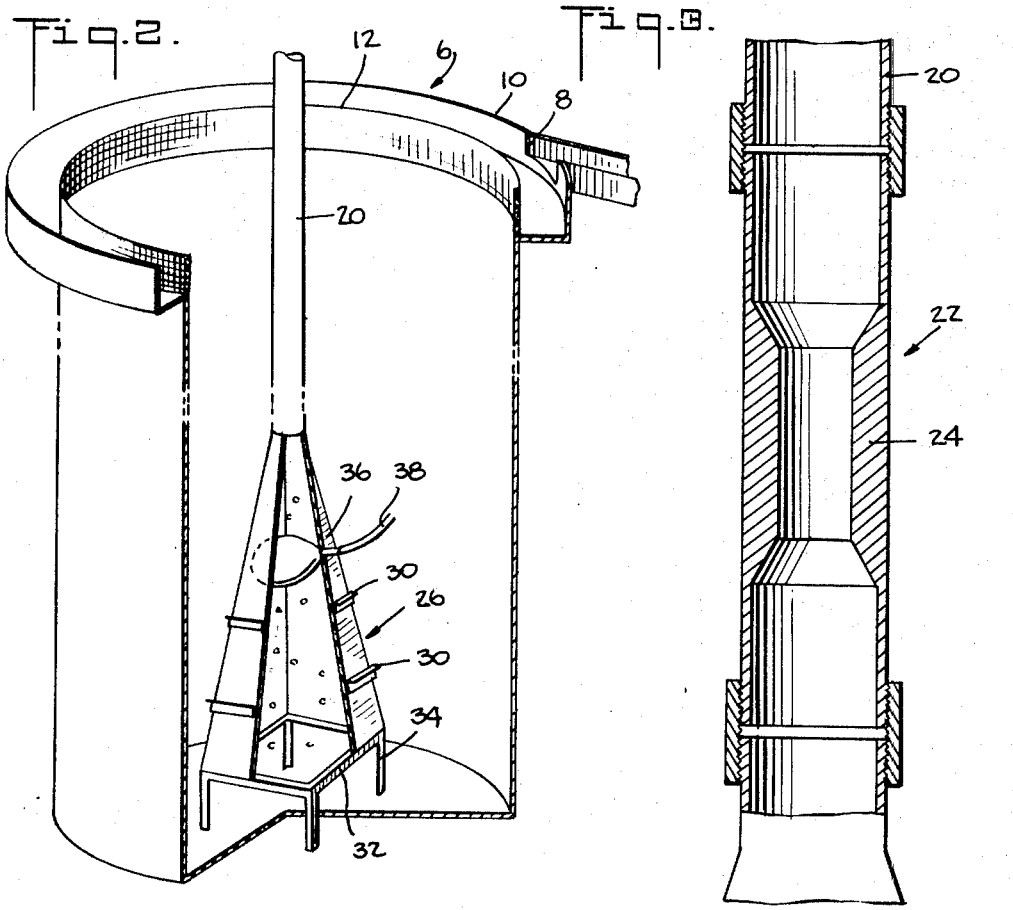
Fig. 2.
Fig. 3.

FISH HUSBANDRY SYSTEM

BACKGROUND OF THE INVENTION

This invention relates to a system for large scale raising of fish for food in an artificial environment, sometimes referred to as fish farming. In particular the invention relates to an improvement in a fish farming system of a type similar to that disclosed in the patent application of Keen Buss Ser. No. 162,910 filed July 15, 1971 for "Fish Husbandry System".

The aforementioned application of Keen Buss discloses a system in which fish are confined in a plurality of upright, water-filled tanks through which water is conducted in serial flow by conduits. The flow of water within each tank is from the bottom to the top with air or oxygen being introduced into the bottom region of each tank so that sufficient oxygen is carried upwardly to the fish. With such a system very high concentrations of fish can be raised, for example a fish density of 6 pounds of fish per cubic foot of water is contemplated.

With such a high concentration of fish, the aggregate daily oxygen demand of the fish in the tank is very high and problems can arise in dissolving a sufficient volume of oxygen per day in the tank water to sustain fish life, without loss of a substantial proportion of the oxygen supplied to the atmosphere in the form of bubbles rising to the surface.

One method of introducing oxygen into water, disclosed in the application of Richard Speece Ser. No. 32,846 filed Apr. 29, 1970 for "Downflow Bubble Contact Aeration Apparatus and Method", now U.S. Pat. 3,643,403, issued Feb. 22, 1972, utilizes a downwardly divergent, funnel-shaped hood extending into a body of water. Oxygen or air injected into the water flowing through the hood forms bubbles which become trapped within the hood region for a sufficiently long period to promote dissolving of the oxygen in the water. The Speece device, it is disclosed, is useful for re-aerating bodies of water such as streams for promoting the growth of game fish. The Speece teachings do not disclose the use of such a device in the artificial environment of a water tank in which fish are confined at high density in an upflow of water and it might be expected that the marked water turbulence associated with the Speece device might render it undesirable for such an artificial and confined environment.

Surprisingly, however, in the practice of the present invention, it has been found that a hood type aeration unit in association with a high density fish rearing tank having an upflow of water therein, provides an environment which is highly favorable for the high density raising of fish.

SUMMARY OF THE INVENTION

A fish husbandry system according to the present invention is intended to sustain the growth of fish contained within a water tank at high density, with an efficient use of oxygen and a minimum wastage thereof by promoting efficient dissolving of oxygen at a high rate into the water.

In more detail, a fish husbandry system according to a preferred embodiment of the invention, includes a generally vertical, water-filled tank adapted to contain fish. A water outlet connected with the tank adjacent the water level therein provides for flow of water outwardly of the tank. A conduit supplies an inflow of water from an external source. A flow unit, connected with the conduit and with the tank, defines a vertically extending region through which the inflow of water is directed downwardly while being segregated from the water within the tank. The lower end of the flow unit is in fluid communication with the water in the lower end of the tank. A gas injector connected with the flow unit injects oxygen-containing gas under pressure into the water within the flow unit. The flow unit maintains the inflow of water in contact with the injected gas for a sufficient period prior to mixture with the water in the tank to cause at least a major portion of the oxygen in the injected gas to dissolve in the water, thereby promoting efficient use of oxygen with a minimum wastage due to bubbles of oxygen floating to the surface.

In particular, the flow unit includes a conduit connected with a water supply, having a downwardly divergent, funnel-shaped hood at its lower end positioned within the tank. The open bottom of the hood is positioned near the bottom of the tank. The gas, which is injected into the upper region of the hood, forms bubbles which are carried downwardly by the inflow of water through the hood. The divergent shape of the hood causes the velocity of the water to be progressively reduced thereby holding and trapping the bubbles for a sufficiently prolonged period within the hood to cause substantially all the oxygen within the bubbles to dissolve in the water before the bubbles reach the bottom of the hood.

BRIEF DESCRIPTION OF THE DRAWINGS

A fish husbandry system constructed in accordance with the preferred embodiment of the invention, is illustrated in the accompanying drawings in which:

FIG. 1 is a cross-sectional side view of a fish husbandry system constructed in accordance with the preferred embodiment of the invention;

FIG. 2 is a perspective view, partially in cross-section, of one of two fish raising tanks forming a part of the fish husbandry system shown in FIG. 1;

FIG. 3 is a cross-sectional side view of a flow constrictor forming a part of the fish husbandry system shown in FIG. 1 taken along the lines 3—3 therein;

DETAILED DESCRIPTION

Figure 4:
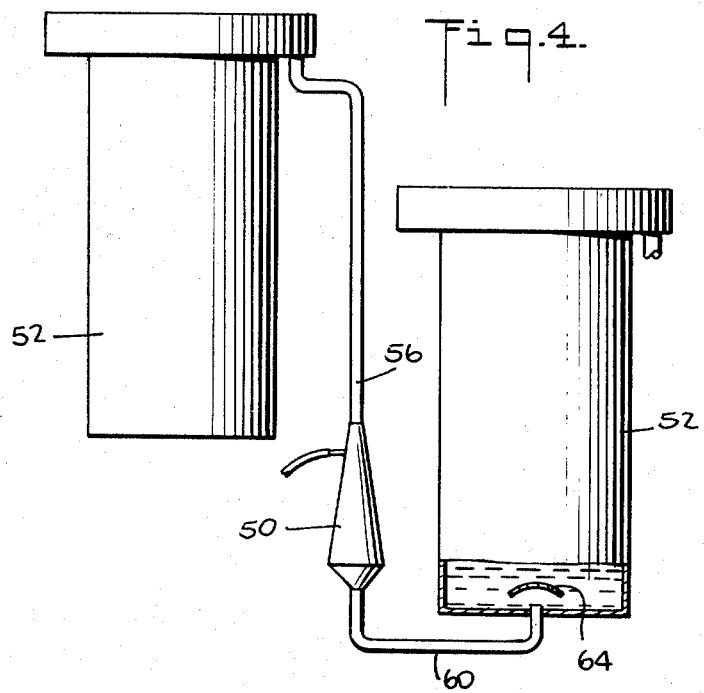
FIG. 4 is a side view, partially in cross-section, of a second embodiment of the invention in which an oxygen injector forming a part of the fish husbandry system is positioned externally of the fish tanks.

Referring to FIG. 1 of the drawings, a fish husbandry system constructed in accordance with a preferred embodiment of the invention is there shown.

The system includes identical, water-filled first and second fish rearing tanks 2 and 4 arranged in vertically staggered relation with the water level in the first tank 2 spaced above the water level in the second tank 4. Fish at very high densities are contained within the fish tanks. Each of the tanks is a cylindrical drum having a closed bottom and an open upper end with an annular gutter 6 (FIG. 2) secured to and extending around the upper end of the tank. Water in the fish tank spills over the upper end of the drum into the annular gutter 6 and passes outwardly therefrom through a notch 8 in a vertical peripheral wall 10 of the gutter 6. To screen the fish offal out of the water passing into the annular gutter 6, a vertical, annular, wire mesh screen 12 extending upwardly from and aligned with the wall of the drum, is provided.

Water from an external source is introduced into the first fish tank 2 through an inlet pipe 20 extending concentrically, vertically down into the tank. The supply of water to the tank may be from a previous, similar fish tank in a series of the fish tanks or may be previously unused water from a suitable source such as a pumping station. Secured to the lower end of the inlet pipe 20 is a flow constrictor 22 (FIG. 3) comprising a section of similar gauge pipe to the inlet pipe 20 but having a constricted throat portion 24 mounted internally to reduce the cross-sectional area through which the inflow of water must pass. The dimensions of the throat in relation to the expected water flow in gallons per minute are calculated to give a predetermined water velocity for purposes which will be described hereinafter.

Connected to the lower end of the flow constrictor 22 is a flow unit or hood 26. The hood 26, which is constructed out of sheet metal, is configured as a downwardly divergent, four-sided funnel of rectangular cross section. Strengthening ribs 30 are provided on the exterior of the hood to lend it rigidity. The lower end of the hood 26 is supported by a trestle 32, fabricated from angle iron, which includes four legs 34 whose lower extremities rest upon the bottom of the fish tank 2. The bottom of the hood 26 is very close to the bottom of the fish tank in relation to height of the tank so that water which has passed through the inlet conduit and hood is mixed with the water in the tank substantially at the bottom of the tank.

Oxygen-containing gas is introduced under pressure into the interior of the hood 26 through a connection pipe 36 secured to one of the sidewalls of the hood a short distance below its apex. The connection 36 is connected by a flexible conduit 38, such as a high pressure rubber hose to a suitable source of oxygen-containing gas, for example as a cylinder of liquid oxygen or the like. Although air under pressure could be used, its use would introduce additional nitrogen into solution which could contribute to gas embolism of the fish. In the preferred embodiment, therefore, pure oxygen is injected into the water. The pressure at which the oxygen is injected must be sufficient to overcome the hydrostatic head corresponding to the depth of submersion of the hood.

The velocity of the water entering the hood 26 is sufficiently fast to overcome the buoyancy of the bubbles and carry them downstream from the point of gas injection. Because of the divergent shape of the hood 26 which progressively increases the cross-sectional area of the flow path in a downstream direction, the velocity of the inflowing water decreases progressively in a downstream direction until, at the bottom of the hood, the water velocity is less than the upward velocity of the bubbles due to their natural buoyancy. As a result, the bubbles of gas are trapped for a prolonged period within the hood. As the extent to which the bubbles will become dissolved depends importantly on the time which they are kept in contact with the water under pressure, by trapping the bubbles within the hood in this way a substantially increased dissolution of the bubbles into solution is achieved. In addition the configuration of the hood promotes substantial turbulence in the water which further assists dissolving of the bubbles into solution.

By the use of the hood in conjunction with the injection of pure oxygen it is possible to supersaturate the water within the hood with oxygen at a level in excess of 200 percent of the level of dissolved oxygen which would be present in water saturated with air under the conditions of temperature and atmospheric pressure prevailing. Additionally the supply of oxygen has been utilized with absorption efficiencies in the region of 90 percent under such conditions. Such a high level of dissolved oxygen satisfies the high oxygen demands made by the fish in view of their large numbers within the confined body of water and also assists in offsetting the toxic effects of the ammonia-containing wastes which the fish generate in considerable amounts in the water.

As indicated the velocity profile within the hood necessary to trap bubbles within it, requires that the velocity of the inflowing water be greater than the buoyant velocity of the bubbles at the upper end of the hood and lower at the bottom end of the hood. For a fixed hood configuration and a constant inflow rate of water in gallons per minute, the variable to be controlled is the incoming velocity at the upper end of the hood which is effected by configuring the previously mentioned throat constrictor portion 24 to give the desired rate of flow. For example using a tank 17 feet high, and introducing water through a 6 inch supply pipe at the rate of 100 gallons per minute, it has been found that a desirable velocity profile can be achieved when the throat 24 is configured to provide a velocity into the upper part of the hood 7–8 feet per minute with a flow period through the hood of about 10 seconds. If the water flow rate is to be changed, it is necessary to alter the dimensions of the throat portion 24 which can be done either by stripping down the apparatus and putting in a new flow constrictor section 22 or, alternatively, by providing a variable obstruction such as a needle valve (not shown) movable vertically into and out of the throat 24 to provide a variable flow controller.

An example of the conditions that have been provided in a tank is as follows:

EXAMPLE

| Tank Dimensions | 7½ ft. dia. | 17½ ft. depth | 773 cu. ft. volume |
|---|---|---|---|
| Water Capacity | 5450 gallons | | |
| Fish | 100,000 rainbow trout, 4–5 inches length, aggregate fish weight 1790 lbs. | | |
| Flow | 100 gallons per minute | | |
| Oxygen Supplied Daily | 18.9 lbs. | | |
| Daily Fish Meal Consumption | 32 lbs. | | |

Because of the efficiency of the hood 26 in promoting solution of gas into the water, it is desirable to remove some of the gaseous nitrogen ($N_2$) as the water passes from one tank to the next and also to avoid entraining additional nitrogen in the form of air bubbles during such passage. For this purpose a water box 40 (FIG. 1) is provided between the first and second tanks 2 and 4. The water flowing out from the notch portion 8 in the gutter 6 of first tank 2 flows down a downwardly inclined rectangular channel 42 into the top of the water box 40 which is a water-filled, rectangular box open at its upper end. Turbulence of the water flowing into the box 40 creates bubbles, whorls and eddies near the surface. The box 40 is sufficiently deep to insure that none of the bubbles travel sufficiently far down in the water box to reach its bottom. Water leaves through an opening in the bottom of the water box, which is connected via a conduit 44 to the upper end of an inlet pipe 46 (similar to the inlet pipe 20) of the downstream, second tank 4. It will be appreciated that the water box 40 reduces the likelihood that bubbles of gas rich in nitrogen will be drawn into the hood 26 within the second of the tanks, in which such bubbles would be dissolved thereby undesirably increasing the dissolved nitrogen content in the water.

Figure 5:
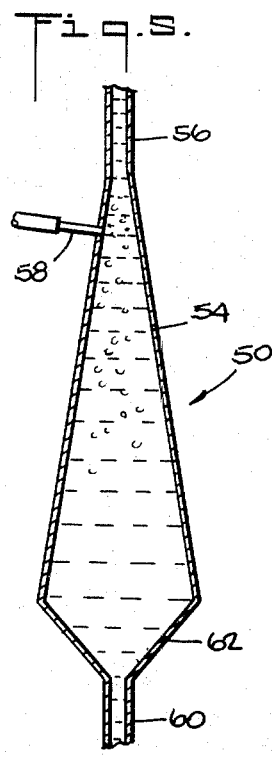
FIG. 5 is a cross-sectional view on an enlarged scale of the oxygen injector shown in FIG. 4.

In a second embodiment of the invention (FIGS. 4 and 5) an oxygen injector unit 50 is positioned externally of its associated fish tank 52. The injector unit 50 includes a downwardly directed funnel-like housing 54, of generally similar construction to that previously described, connected at its upper end to a conduit 56 leading from the outlet of the preceding upstream tank (or from an external water supply). Bubbles of oxygen under pressure are injected into the upper end of the hood through an oxygen connection 58. Absorption of the oxygen in the bubbles within the hood proceeds in the same way as in the preferred embodiment. Water is conducted out of the hood 54 through a second pipe 60 which is connected to the lower end of the hood through an upwardly divergent mouth portion 62. The opposite end of the second pipe 60 passes through the bottom of the tank 52 to deliver water to the tank. The water entering through the second pipe 60 impinges on a downwardly directed, arcuate baffle 64 which spreads the inflow of water evenly across the bottom of the tank so that the incoming water and the oxygen dissolved in it are carried evenly to the fish in the tank.

Figure 6:
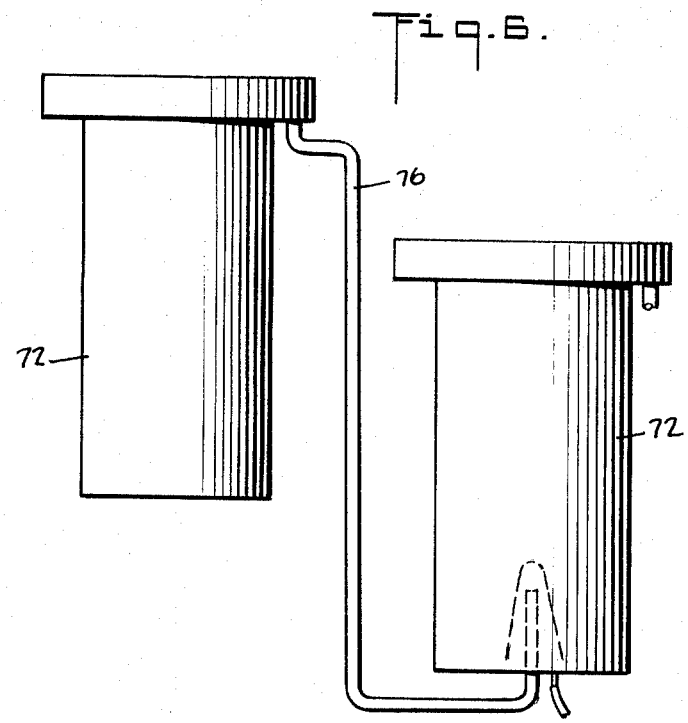
FIG. 6 is a side view, partially in cross-section, of a third embodiment of the fish husbandry system utilizing an oxygen injector positioned internally of the fish tank, which includes a housing having a closed upper end.
Figure 7:
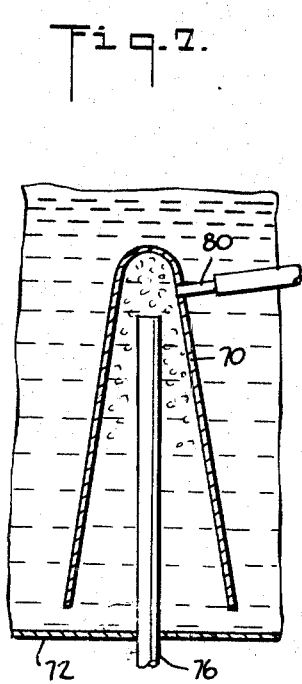
FIG. 7 is a cross-sectional side view of an enlarged scale of a portion of the oxygen injector shown in FIG. 6.

A third embodiment of the invention (FIGS. 6 and 7) also introduces the inflow of water through the bottom of the tank. A hood 70 of the general configuration previously described but having a closed upper end is mounted within a fish tank 72. An outlet conduit 76 for the water leaving the preceding fish tank (or from an external source) at its downstream end includes a vertical portion passing upwardly through the bottom of the tank 72. The outlet end of the conduit 76 is positioned within and closely adjacent the closed upper end of the housing 70 so that the water issuing from the conduit 76 travels upwardly and is then reversed in its direction to pass downwardly within the housing 70 providing a downwardly divergent flow. Oxygen-containing gas is injected into the hood adjacent its upper end through a conduit 80. The injected bubbles of gas become dissolved in the same manner as for the precedingly described embodiments.

What is claimed is:

1. In a fish husbandry system for the large scale raising of fish for human consumption of the type including one or more series-connected water filled tanks containing fish at a high density, with the water flow in each tank being from bottom to top at a predetermined rate, an inflow of feed water to the system being through an inlet conduit leading into the top of a downwardly divergent hood in at least one of the tanks, the lower end of the hood being in fluid communication with the water in the lower end of said tank, oxygen gas being injected into the water flowing through the hood to cause a large proportion of said gas to be dissolved in the water for maintenance of a desired level of oxygen in said tank for the raising of said fish, the improvement comprising constricted throat means interposed between said inlet conduit and the top of said hood for regulating the velocity of inflow of water into said hood within predetermined limits for optimum dissolution of said oxygen in said water, at least a portion of said throat means having an internal diameter less than that of said inlet conduit.

2. In the apparatus of claim 1, said throat means comprising a conduit section having an axially extending internal portion of reduced cross-sectional dimension, the inlet and exit ends thereof having tapered portions joining the section to said inlet conduit and said hood respectively.

* * * * *